US012320004B2

(12) United States Patent
Wable et al.

(10) Patent No.: US 12,320,004 B2
(45) Date of Patent: Jun. 3, 2025

(54) PROCESS FOR GRAPHENE-LIKE CARBON COATING ON SUBSTRATES

(71) Applicants: Indian Institute of Science Education and Research, Pune (IN); TCG CENTRES FOR RESEARCH AND EDUCATION IN SCIENCE AND TECHNOLOGY, Kolkata (IN)

(72) Inventors: Minal Wable, Ahmednagar (IN); Mohammad Furquan, Moradabad (IN); Abhik Banerjee, Kolkata (IN); Satishchandra Ogale, Pune (IN)

(73) Assignees: Indian Institute of Science Education and Research, Pune (IN); TCG CENTRES FOR RESEARCH AND EDUCATION IN SCIENCE AND TECHNOLOGY, Kolkata (IN)

( * ) Notice: Subject to any disclaimer, the term of this patent is extended or adjusted under 35 U.S.C. 154(b) by 0 days.

(21) Appl. No.: 18/085,540

(22) Filed: Dec. 20, 2022

(65) Prior Publication Data

US 2023/0193469 A1    Jun. 22, 2023

(30) Foreign Application Priority Data

Dec. 20, 2021  (IN) .............. 202121059467

(51) Int. Cl.
*C23C 18/14*     (2006.01)
*C01B 32/154*   (2017.01)
(Continued)

(52) U.S. Cl.
CPC .......... *C23C 18/143* (2019.05); *C01B 32/154* (2017.08); *C01B 32/162* (2017.08); *C01B 32/18* (2017.08); *C01B 32/184* (2017.08); *H01M 4/663* (2013.01); *C01B 2202/22* (2013.01); *C01B 2204/22* (2013.01); *C01P 2002/74* (2013.01); *C01P 2002/82* (2013.01); *C01P 2004/03* (2013.01); *C01P 2006/40* (2013.01)

(58) Field of Classification Search
CPC . B01D 67/0067; B01J 20/3078; C23C 18/143
See application file for complete search history.

(56) References Cited

U.S. PATENT DOCUMENTS

2017/0062821 A1 *  3/2017  Tour ...................... H01G 11/36

FOREIGN PATENT DOCUMENTS

CN    110482531    * 11/2019
EP    0230128      *  7/1987
(Continued)

OTHER PUBLICATIONS

Jung Bae Lee et al, Energies 13, (2020)6567, p. 1-9. (Year: 2020).*
(Continued)

*Primary Examiner* — Tabassom Tadayyon Eslami
(74) *Attorney, Agent, or Firm* — Rahman LLC

(57) ABSTRACT

The present disclosure relates to a patternable process for coating functional and adherent graphene-like carbon on multiple substrate types using $CO_2$ laser-induced photothermal pyrolysis in scanning mode. The poly furfuryl alcohol (PFA) synthesised via low-temperature polymerisation of furfuryl alcohol precursor without any additives was used to form graphene-like carbon material.

3 Claims, 16 Drawing Sheets

(51) Int. Cl.
*C01B 32/162* (2017.01)
*C01B 32/18* (2017.01)
*C01B 32/184* (2017.01)
*H01M 4/66* (2006.01)

(56) References Cited

FOREIGN PATENT DOCUMENTS

| | | | |
|---|---|---|---|
| JP | 2002-537991 | * | 11/2002 |
| KR | 20210002261 | * | 1/2021 |
| WO | 20014/133236 | * | 4/2014 |
| WO | 2017133236 | * | 9/2014 |

OTHER PUBLICATIONS

Abdulhafez et al, Applied Nanomaterials, 4(2021) 2973-2986. (Year: 2021).*

* cited by examiner

Figure 1

| Precursor material | Structure | Laser source | Carbon form obtained | $I_G/I_D$ (approx.) | Ref |
|---|---|---|---|---|---|
| Polyimide (Kapton tape) | | $CO_2$ laser | Graphene like carbon | 3.2 | 7 |
| Polyimide (Kapton tape) | | Nd:YAG laser | Graphene like carbon | 0.7 | 8 |
| Polyetherimide (PEI) | | $CO_2$ laser | Graphene like carbon | 1.4 | 7 |
| Polysulfone (PSU) | | $CO_2$ laser | S-doped Graphene like carbon | 1.2 | 9 |
| Poly (ether sulfone) silico (PES) | | $CO_2$ laser | S-doped Graphene like carbon | 1.7 | 9 |

Figure 1 (continued)

| Precursor material | Structure | Laser source | Carbon form obtained | $I_G/I_D$ (approx.) | Ref |
|---|---|---|---|---|---|
| Polyphenyl sulfone (PPSU) | | $CO_2$ laser | S-doped Graphene like carbon | 1.4 | 9 |
| Wood (PINE) (cellulose & lignin) | | $CO_2$ laser | Graphene like carbon | 1.1 | 10 |
| Nomex (poly(m-phenylenediamine)isophthalamide) | | $CO_2$ laser | Graphene like carbon | 2.2 | 11 |
| Torlon (polyamide Imide, PAI) | | $CO_2$ laser | Graphene like carbon | 5.2 | 11 |
| Kevlar (poly(paraphenylene terephthalamide) | | $CO_2$ laser | Graphene like carbon | 1.1 | 11 |

Figure 1 (continued)

| Precursor material | Structure | Laser source | Carbon form obtained | $I_G/I_D$ (approx.) | Ref |
|---|---|---|---|---|---|
| Polyether ether ketone (PEEK) | | $CO_2$ laser | Graphene like carbon | 3.5 | 11 |
| Chlorinated poly (vinyl chloride) (CPVC) | | $CO_2$ laser | Graphene like carbon | 1.1 | 11 |
| Polystyrene (cross-linked), Rexolite | | $CO_2$ laser | Graphene like carbon | 0.9 | 11 |
| Epoxy | | $CO_2$ laser | Graphene like carbon | 1.2 | 11 |
| Phenolic resin | | $CO_2$ laser | Graphene like carbon | 1.1 | 11 |

Figure 1 (continued)

| Precursor material | Structure | Laser source | Carbon form obtained | $I_G/I_D$ (approx.) | Ref |
|---|---|---|---|---|---|
| Polydimethylsiloxane (PDMS) | (PDMS structure) | $CO_2$ laser | N-doped cubic silicon carbide | Not given | 12 |
| Polytetrafluoroethylene (PTFE) | (PTFE structure) | $CO_2$ laser | F doped Graphene like carbon | 0.8 | 13 |
| Poly(bis(4-(2H-benzo[e][1,3]oxazin-3(4H)-yl)phenyl)methane)(poly(Ph-ddmm)) | (poly(Ph-ddmm) structure) | $CO_2$ laser | Graphene like carbon | 1.4 | 14 |

Figure 1 (continued)

| Precursor material | Structure | Laser source | Carbon form obtained | $I_G/I_D$ (approx.) | Ref |
|---|---|---|---|---|---|
| Coconut | | | | 1.87 | 11 |
| Bread | | | | 1.1 | |
| Boric acid-treated cardboard | | $CO_2$ laser | Graphene like carbon | 0.96 | |
| Boric acid-treated paper | | | | 0.96 | |
| Charred paper | | | | 0.97 | |
| Muslin cloth | | | | 0.72 | |

PROCESS FOR GRAPHENE-LIKE CARBON COATING ON SUBSTRATES

FIELD OF THE INVENTION

The present disclosure relates to the technical field of carbon-based materials. In particular, the present disclosure relates to a process for coating functional and adherent graphene-like carbon on multiple substrate types using $CO_2$ laser-induced photothermal pyrolysis. The adherent poly furfuryl alcohol (PFA) coating was synthesised on multiple substrates without any additives via low-temperature polymerisation of furfuryl alcohol; a small molecular room temperature liquid precursor was used to form graphene-like carbon material.

BACKGROUND OF THE INVENTION

Background description includes information that may be useful in understanding the present invention. It is not an admission that any of the information provided herein is prior art or relevant to the presently claimed invention or that any publication specifically or implicitly referenced is prior art.

Porous carbon materials offer the advantages of large specific surface area, high electrical conductivity, high chemical stability and thereby have great importance for various applications in the field of electrochemistry (Liu, J.; et al., *Journal of Materials Chemistry A* 2019, 7 (37), 21168-21175; Li, F.; Zhou, Z., *Small* 2018, 14 (6); Zhang, L. L.; et al., *Chemical Society reviews* 2009, 38 (9), 2520-31; Chinnadurai, D.; et al., *New Journal of Chemistry* 2019, 43 (29), 11653-11659; Inagaki, M.; et al., *Materials science and engineering of carbon: fundamentals*. Butterworth-Heinemann: 2014).

Carbon-based materials have also impacted research in the field of nanotechnology significantly due to the process and precursor achievable control on morphology (e.g., nanosheets, nanotubes, nanospheres, nanofibers, hollow nanofibre, nanospheres, etc.) (Zhang, P.; et al., *ChemCatChem*, 2015, 7 (18)). Graphene is a two-dimensional (2D) $sp^2$-hybridized allotrope of carbon with impressive optical transparency, thermal conductivity, electrical conductivity, as well as chemical, physical and mechanical properties (Liang, M.; Luo, B.; Zhi, L., *International Journal of Energy Research* 2009, 33 (13), 1161-1170; Allen, M. J.; et al., *Chemical reviews* 2010, 110 (1), 132-145). The material has shown immense potential for real-world scalable applications in nanotechnology. Graphene can be stacked up into many layers as graphite, rolled up into carbon nanotube, or wrapped up into fullerene (Campbell, B.; et al., Springer 2018).

Nowadays, graphene is synthesised using various methods like pyrolysis of carbonaceous materials, thermal chemical vapour deposition (CVD), epitaxial growth on substrates, template route, fully organic synthesis, etc. However, the available methods involve high production costs, are time-consuming and require a sophisticated operational setup (Lee, X. J., et al., *Journal of the Taiwan Institute of Chemical Engineers*, 2019, 98, 163-180). Recently, laser-induced graphene (LIG) was synthesised photo-thermally using direct laser writing, enabling a rapid route for synthesising graphene layers on various materials. The relatively low-cost 10.6 μm continuous wave (CW) or pulsed $CO_2$ laser primarily produces GLC on multiple material substrates. It has shown great potential for electrocatalysis, energy storage, sensors, and electronics applications, etc. (Lin, J.; et al., *Nature communications*, 2014, 5 (1), 1-8). So far, various materials studied to produce GLC are shown in FIG. 1.

A long pulse of $CO_2$ laser primarily induces thermal decomposition of polymers (or organic molecules), whereas a short pulse results in photochemical reaction (Schmidt, H.; et al., *Journal of applied physics* 1998, 83 (10), 5458-5468). The very long wavelength of $CO_2$ laser (10.6 μm) induces vibrational excitation (rather than electronic one), which generates significant local heating, resulting in the decomposition of molecules. The literature has reported that many polymers undergo $CO_2$ laser-based photothermal decay but do not lead to carbon formation (Lin, J.; et al., *Nature communications* 2014, 5 (1), 1-8). A limited number of polymers mentioned in FIG. 1 are shown to yield graphene-like carbons by laser decomposition.

However, there are certain intrinsic technical limitations of the materials mentioned above in the context of applications (in FIG. 1). Materials such as Polyether ether ketone (PEEK), Teflon and wood have poor processability and are not convenient for obtaining products with desired shapes and dimensions. Also, renewable carbon resources cannot ensure the repeatability and stability of the obtained GLC because of complex non-precisely controlled components. In the case of polytetrafluoroethylene (PTFE) or Teflon, it is difficult to use conventional molten-state processing methods to obtain GLC on a desirable substrate (Ye, R.; et al., *ACS nano* 2018, 12 (2), 1083-1088). PI, PEI, PEEK and PEI are extremely expensive and often require a post-cure to achieve their full potential and high-temperature processing requirements. Polymers like polystyrene are subject to environmental stress cracking (Sousa, A. R.; et al., *Polymer Degradation and Stability* 2006, 91 (7), 1504-1512; Yan, Y.; et al., *Polymers* 2020, 13 (1)). Also, in some instances (for example, coconut shell derived laser-induced carbon) graphene-like nature of carbon is not realised, limiting its device application interest. Moreover, the odd shape of such objects is not device-worthy.

PFA is generally prepared from commercially available FA by dihydroxylation using acids. PFA is also used as a carbon source by pyrolysing at high temperatures (600-1200° C.) under an inert atmosphere (e.g., Argon, nitrogen). Pyrolytically, PFA-derived carbons have been applied to several energy storage applications such as supercapacitors, anode materials for battery applications, carbon coating on silicon anode, etc.

Therefore, there is a need in the art to provide a direct writing process for coating functional and adherent graphene-like carbon on multiple substrate types using $CO_2$ laser-induced photothermal pyrolysis that is simple, cost-effective, and carried out at ambient air. The present disclosure satisfies the existing needs, as well as others, and generally overcomes the deficiencies found in the prior art.

OBJECTS OF THE INVENTION

It is an object of the present disclosure to provide a process for coating graphene-like carbon on multiple substrate types using $CO_2$ laser-induced photothermal pyrolysis.

It is another object of the present disclosure to provide a process for coating graphene-like carbon on multiple substrate types using $CO_2$ laser-induced photothermal pyrolysis that is simple and highly cost-effective.

It is another object of the present disclosure to provide a process for coating graphene-like carbon on multiple substrate types using $CO_2$ laser-induced photothermal pyrolysis using a small molecular room temperature liquid precursor furfuryl alcohol (FA).

SUMMARY OF THE INVENTION

The foregoing and other objects are attained by the present disclosure, which is an aspect that provides a process for coating graphene-like carbon on multiple substrate types using $CO_2$ laser-induced photothermal pyrolysis.

In one aspect, the present disclosure provides a process for coating a graphene-like carbon on multiple substrate types using $CO_2$ laser-induced photothermal pyrolysis comprising the steps of:
- (a) casting furfuryl alcohol on a substrate to obtain a casted substrate;
- (b) heating the casted substrate at a temperature in a range of 60° C. to 130° C. to obtain a polymerised poly furfuryl alcohol film-coated substrate; and
- (c) irradiating the polymerised poly furfuryl alcohol film using $CO_2$ laser in scanning mode to obtain a graphene-like carbon coated on the substrate.

In an embodiment of the present disclosure, the casting is drop-casting and can be carried out on multiple substrates.

In an embodiment of the present disclosure, the heating of the casted substrate is for a period of 1 hour to 10 hours.

In another embodiment of the present disclosure, the substrate can be non-porous, porous, metallic, non-metallic, semiconducting, insulating or soft materials.

In another embodiment of the present disclosure, the graphene-like carbon can from a few layers to multilayered.

In another embodiment of the present disclosure, the graphene-like carbon can be a distinctly different state of carbon and morphology, such as nanosheets, nanospheres, tube and wire-like carbon structures.

In another embodiment of the present disclosure, the irradiating using $CO_2$ laser scanning is held at both X-axis and Y-axis directions.

Various objects, features, aspects and advantages of the inventive subject matter will become more apparent from the following detailed description of preferred embodiments.

BRIEF DESCRIPTION OF THE FIGURES

FIG. 1 is a table showing various materials studied in the art to produce GLC.

DETAILED DESCRIPTION OF THE INVENTION

Figure 2:
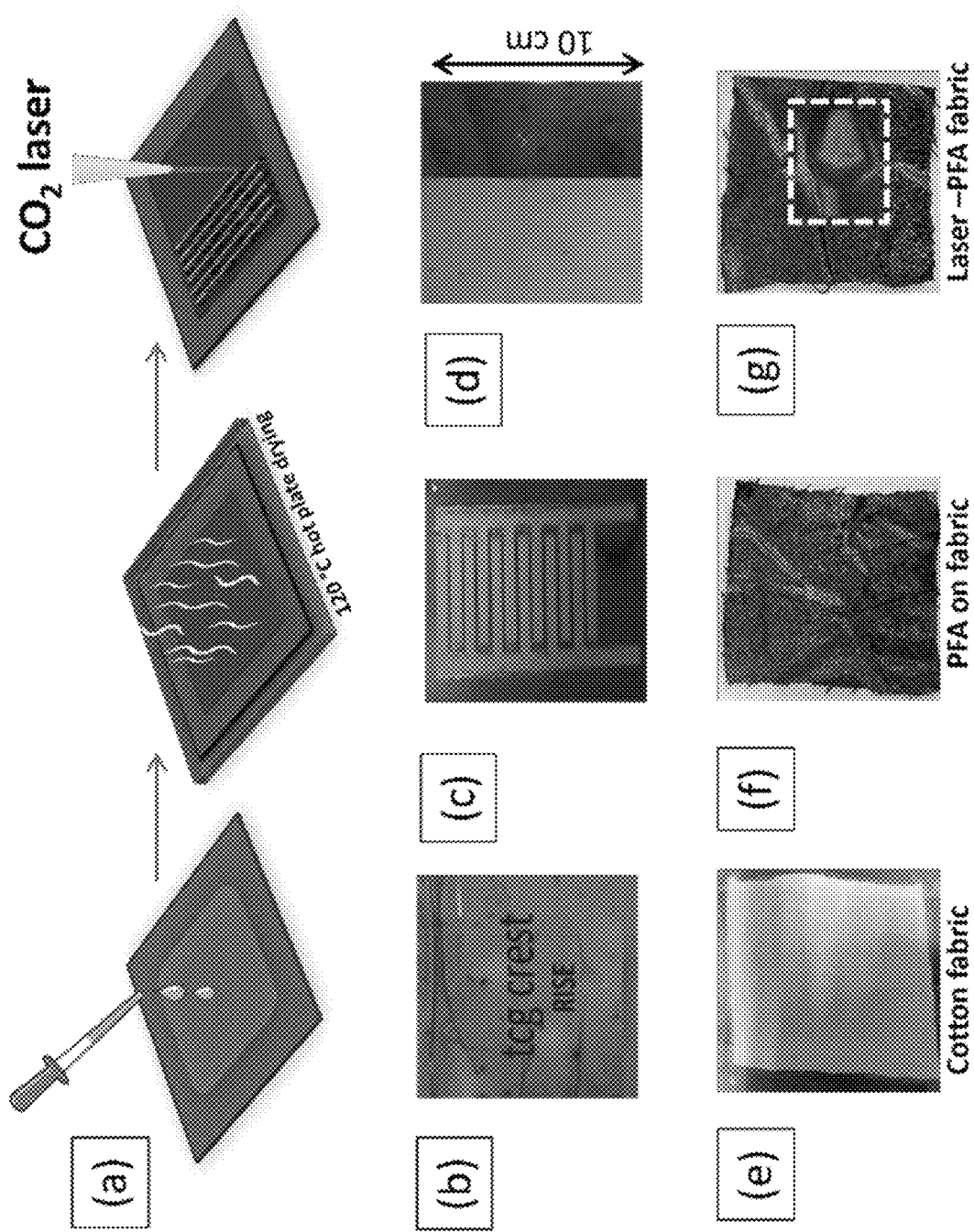
FIG. 2 is the schematic representation showing furfuryl alcohol (FA) liquid is drop-cast (a) on a substrate followed by drying into the oven and laser treatment to form PFA derived GLC, (b) laser patterned writing (TCG CREST-RISE) on PET substrate; the black area represents GLC whereas the brown part is untreated PFA, (c) micro supercapacitor patterning on PFA coated PET sheet, (d) large-area coating of PFA derived GLC using $CO_2$ laser (left, grey part), PFA coating on Cu CC (right copper-like color), (e-g) fabric, PFA coating on fabric and after its laser treatment respectively.

The following is a detailed description of embodiments of the present disclosure. The embodiments are in such detail as to clearly communicate the disclosure. However, the amount of detail offered is not intended to limit the anticipated variations of embodiments; on the contrary, the intention is to cover all modifications, equivalents, and alternatives falling within the spirit and scope of the present disclosure as defined by the appended claims.

Unless the context requires otherwise, throughout the specification which follow, the word "comprise" and variations thereof, such as "comprises" and "comprising" are to be construed in an open, inclusive sense that is as "including, but not limited to."

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As used in this specification and the appended claims, the singular forms "a," "an," and "the" include plural referents unless the content clearly dictates otherwise. It should also be noted that the term "or" is generally employed in its sense, including "and/or" unless the content clearly dictates otherwise.

In some embodiments, the numbers expressing quantities of ingredients, properties such as concentration, reaction conditions, and so forth, used to describe and claim certain embodiments of the invention are to be understood as being modified in some instances by the term "about." Accordingly, in some embodiments, the numerical parameters set forth in the written description are approximations that can vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the invention are approximations, the numerical values set forth in the specific examples are reported as precisely as practicable.

The recitation of ranges of values herein is merely intended to serve as a shorthand method of referring individually to each separate value falling within the range. Unless otherwise indicated herein, each individual value is incorporated into the specification as if it is individually recited herein.

All processes described herein can be performed in any suitable order unless otherwise indicated herein or otherwise clearly contradicted by context. The use of any and all examples, or exemplary language (e.g. "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

The headings and abstract of the invention provided herein are for convenience only and do not interpret the scope or meaning of the embodiments.

The following discussion provides many example embodiments of the inventive subject matter. Although each embodiment represents a single combination of inventive elements, the inventive subject matter is considered to include all possible combinations of the disclosed elements. Thus, if one embodiment comprises elements A, B, and C, and a second embodiment comprises elements B and D, then the inventive subject matter is also considered to include other remaining combinations of A, B, C, or D, even if not explicitly disclosed.

It should also be appreciated that the present invention can be implemented in numerous ways, including as a system, a method or a device. In this specification, these implementations, or any other form that the invention may take, may be referred to as processes. In general, the order of the steps of the disclosed processes may be altered within the scope of the invention.

Embodiments of the present disclosure provides a process for coating a graphene-like carbon (GLC) layer on multiple substrate types using CO2 laser-induced photothermal pyrolysis, said process comprises the steps of:
  a. casting GLC precursor on a substrate to obtain a casted substrate;
  b. heating the casted substrate at a temperature in a range of 60 deg C. to 130 deg C. to obtain a polymerised GLC (pGLC) film-coated substrate; and
  c. graphitizing the pGLC precursor film using CO2 laser in scanning mode to obtain a pGLC-derived precursor coating layer on the substrate.

In another embodiment of the present disclosure, the GLC precursor is selected from but not limited to furfuryl alcohol, and may include laser carbonizable form of polymer precursors mentioned in table of FIG. 1, thermally polymerizable forms of polymer precursors, small molecules in the form of composites or multilayers, or composites thereof, or combinations thereof. In specific embodiments, the GLC precursor can also be furfuryl alcohol or its composites of furfuryl alcohol, metal organic frameworks or MOFs, covalent organic frameworks or COFs, organometallics and metal complex compounds, and the like.

According to the present disclosure, direct laser writing has not been used or applied before with PFA and has several distinct advantages with specific results. In addition to the fast, cost-effective and scalable strategy to carbonise PFA using $CO_2$ laser in an open atmosphere with the processing stage held at room temperature; there are several material property-specific and other process-optimisation related advantages of the $CO_2$ laser-induced carbonisation in comparison with the conventional high-temperature heat treatment methods followed by the second step of coating on any substrate, or even the existing reported materials synthesised using $CO_2$ laser that are mostly done on material blocks or thick foils.

In an embodiment of the present disclosure, the advantages of the direct laser writing process are: a) FA is an extremely low-cost material compared to most commonly researched materials used to synthesise GLC using $CO_2$ laser, as it is produced from waste biomass; b) furfuryl alcohol produces high-quality GLC; c) FA is liquid at room temperature, which is an advantage over existing reported materials used for GLC synthesis as it can be easily coated on any desirable substrate (including porous substrate); (d) FA is polymerised to form PFA only by heating it at a low temperature of 120° C. without any external addition of acid catalyst and e) FA is coated on a substrate (including polymers, metals, alloy, fabric etc.) followed by low temperature (120° C.) drying in an open atmosphere to obtain solid polymerised PFA coated substrate whereas all other materials demonstrated to produce GLC are directly used in the form of sheets or blocks and not coatings on a substrate.

In a preferred embodiment, the present disclosure provides a process for coating a graphene-like carbon on multiple substrate types using $CO_2$ laser-induced photothermal pyrolysis comprising the steps of:
  (a) casting furfuryl alcohol on a substrate to obtain a casted substrate;
  (b) heating the casted substrate at a temperature in a range of 60° C. to 130° C. to obtain a polymerised poly furfuryl alcohol film-coated substrate; and
  (c) irradiating the polymerised poly furfuryl alcohol film using $CO_2$ laser in scanning mode to obtain a graphene-like carbon coated on the substrate.

In another embodiment of the present disclosure, the heating can be carried out in an oven.

In another embodiment of the present disclosure, the heating temperature is 120° C. in an open-air oven.

In another embodiment of the present disclosure, the substrate can be non-porous, porous, metallic, non-metallic, semiconducting, insulating or soft materials. Preferably, the substrate is PET sheets, Cu foil, plastics, polymers, rubber and the like.

In another embodiment of the present disclosure, the substrate is heated on any hot plate, mainly flat hot-plate maintaining the temperature at 60-120° C.

In another embodiment of the present disclosure, the heating temperature of the substrate can be varied in the range of 60-120° C. in the oven/flat hot plate, especially maintained at 120° C.

In another embodiment of the present disclosure, the heated film on the substrate (refers to FA cast on Cu, PET, etc.) comprises a shining brown/dark brown solid and smooth film, In another embodiment of the present disclosure, the thickness of the film is in the range of 100 nm to 250 µm, primarily maintained at 20 µm-50 µm.

In another embodiment of the present disclosure, the brown (refers to light brown, dark brown) film comprises PFA, which is obtained directly by heating FA at 120° C.

In another embodiment, the process of the present disclosure excludes the use of any external acid catalyst (e.g., $H_2SO_4$ HCl, $HNO_3$, etc.), additive (e.g., graphene oxide, copolymers) or any other extra step for the conversion of FA to PFA.

In another embodiment of the present disclosure, the substrate coated with PFA is directly converted into graphene-like carbon under a $CO_2$ laser.

In another embodiment of the present disclosure, the laser-treated substrate comprises of few-layer graphene structure.

In another embodiment of the present disclosure, the layer graphene structure can be a bilayer to multilayer.

In another embodiment of the present disclosure, the laser-treated substrate comprises traces containing partially burned PFA, graphitic carbon and traces of amorphous carbon or glassy/vitreous carbon.

In another embodiment of the present disclosure, the carbon nano-microstructures prepared by this process bear the precursor-choice related uniqueness.

In another embodiment of the present disclosure, the transient thermal surface treatment afforded by scanned $CO_2$ laser processing leads to a distinctly different state of carbon and morphology such as nanosheets, nanospheres, tube and wire-like carbon structure. In an embodiment, the tuning laser power (0.1 W-30 W), scan speed (1 mm/s-1000 mm/s), and thickness of PFA (100 nm-250 µm) coating result in various carbon morphologies.

In another embodiment of the present disclosure, the nanosheets are obtained at 1.5 W with a 50 mm/s $CO_2$ laser scan rate.

In another embodiment of the present disclosure, the tube-like morphology is attained at 3.0 W with a 50 mm/s $CO_2$ laser scan rate.

In another embodiment of the present disclosure, the nanosphere like morphology is attained at 6.0 W with a 50 mm/s $CO_2$ laser scan rate.

In another embodiment of the present disclosure, the graphene-like carbon (GLC) coating after $CO_2$ laser treatment is adherent on multipurpose substrates.

In various embodiments of the present disclosure, the graphene-like carbon (GLC) comprises blackish, greyish or more grey shining in colour.

In another embodiment of the present disclosure, the adherent coating thickness is in the range of (100 nm-250 µm); more specifically, it is maintained in the range of 10-20 µm.

In another embodiment of the present disclosure, the GLC adherent coating is formed at normal atmospheric conditions under a $CO_2$ laser.

In another embodiment of the present disclosure, the $CO_2$ laser scan width can be maintained in the range of 0.01 mm to 1 mm. More specifically, it is held at 0.1 mm for X-axis and Y-axis scan to get desired GLC coating on the substrates.

In another embodiment of the present disclosure, the GLC can be formed with patterned functional carbon (porous in nature, oxygen and $N_2$, $H_2$ containing groups) on the substrate.

In an embodiment of the present disclosure, the degree of graphitisation and graphene nanostructure of PFA laser direct-written coating (sheet, fibre, or spherical) can be easily tuned by varying the laser and coating parameters, such as scan rate, laser power, coating thickness.

In an embodiment of the present disclosure, the PFA can be photothermally carbonised to form graphene-like carbon at room temperature under ambient conditions, which is economically cheaper than high temperature (600-1000° C.) decomposition under the $N_2$ or Ar gas for a long duration.

In an embodiment of the present disclosure, the PFA-based GLC shows additional advantages in terms of graphitisation over the conventional high-temperature pyrolysing process. The 2D Raman band appears in the case of PFA-derived GLC, which signifies a few-layer graphene-like nature, whereas the 2D band is missing in the case of conventional high temperature pyrolysed PFA under inert atmosphere.

According to the present disclosure, the PFA-derived GLC shows a maximum $I_G/I_D$ intensity band of 1.71 (the higher the $I_G/I_D$ ratio, the higher is the graphitic nature of carbon), whereas the PFA-derived carbon by high-temperature pyrolysis shows a maximum $I_G/I_D$ ratio of 1.

In another embodiment of the present disclosure, the PFA derived GLC is extremely adherent in nature without any need of post-treatment, which can prevent corrosion, crack formation, breaking, or pulverisation when it is applied as a coating on the desired substrate in multiple applications (current collector anode free battery, supercapacitor, anode materials for Li and Na ion battery, conductive additive, counter electrode for solar cell etc.). The adherent character of the coating can be attributed to the oxygen in PFA in addition to the reactive carbon released in the laser processing.

In another embodiment of the present disclosure, PFA derived GLC coating using $CO_2$ laser being a direct writing process can be used to pattern functional carbon on substrate materials in various shapes, properties, and dimensions for the realisation of diverse device architectures.

In another embodiment of the present disclosure, the PFA derived GLC can be patterned on a flexible substrate for micro supercapacitor and flexible electronics applications.

In certain embodiments of the present disclosure, the desired micropatterning and writing can be done using a $CO_2$ laser directly on PFA coating to achieve GLC patterns for several applications, such as micro supercapacitor, gas sensor, electrochemical sensor, etc., whereas conventional annealing based carbon is not suited for patterning.

EXAMPLES

General Procedure:

FA was drop cast on a substrate and heated at 120° C. for a few hours (1-10 h) for rendering a polymerised solid brown coloured PFA film. The PFA coating thickness was typically around 20 µm (the process is applicable at other thicknesses also) on the surface. $CO_2$ Laser processing was performed on this coating at different laser energy density values and scan speeds in the air under ambient conditions. To get a proper adherent carbonised film, laser speed was set to 50 mm/s, and the distance between two scanning lines was kept at 0.1 mm. After scanning in the X-direction, the same sample was scanned along the Y-direction, essentially causing double laser treatment of polymer coating. Depending on the thickness and other experimental conditions, the process parameters could be varied and optimised. FIG. 2 is the schematic representation showing furfuryl alcohol (FA) liquid is drop-casted (a) on a substrate followed by drying into oven and laser treatment to form PFA derived GLC, (b) laser patterned writing (TCG CREST-RISE) on PET substrate; the black area represents GLC whereas the brown part is untreated PFA, (c) micro supercapacitor patterning on PFA coated PET sheet, (d) large-area coating of PFA derived GLC using $CO_2$ laser (left, grey part), PFA coated on Cu foil (right, copper like color) (e-g) fabric, PFA coating on fabric and after its laser treatment respectively.

Comparative Example

Figure 3:
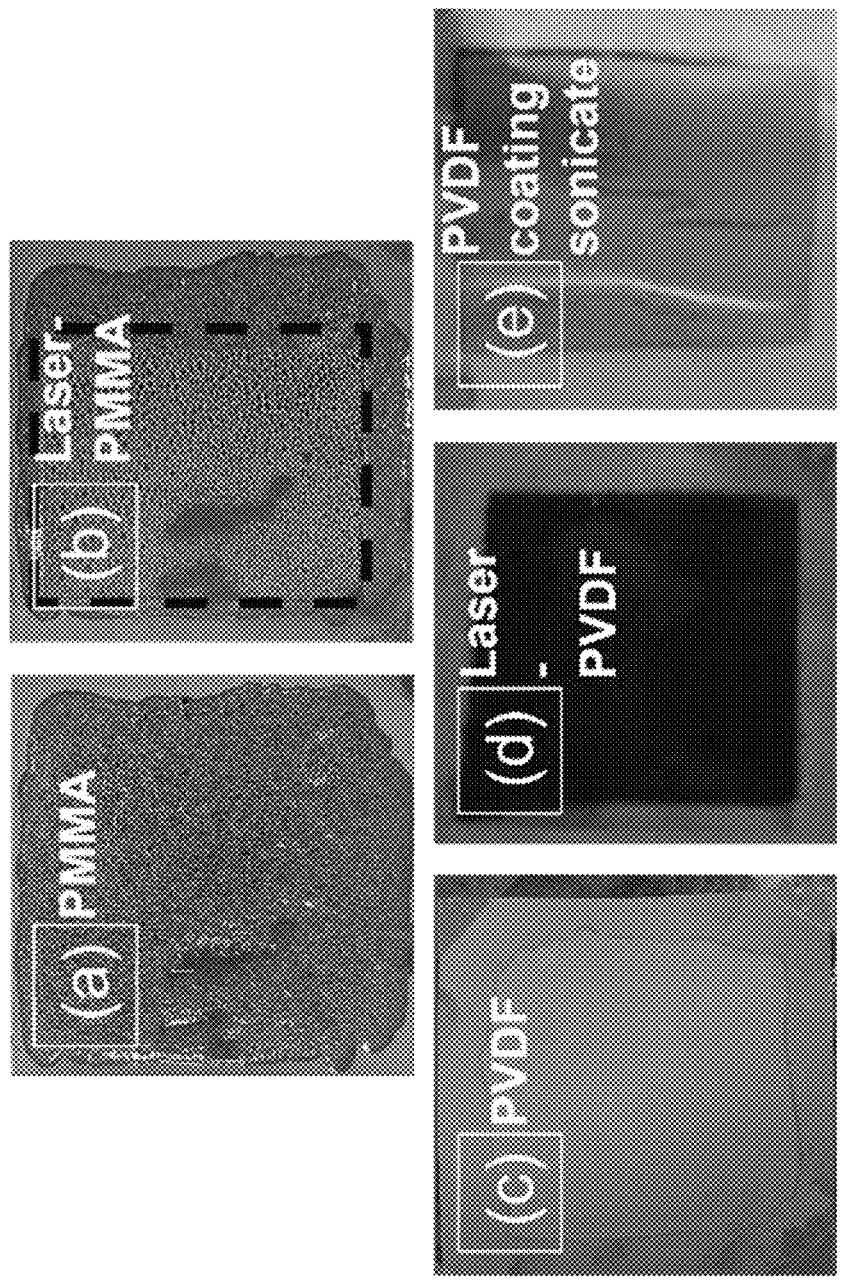
FIG. 3 is the images of (a) PMMA polymers coating on Cu foil, (b) PMMA coating after laser treatment, (c) PVDF polymer coating on Cu foil, (d) after laser treatment of PVDF, (e) Laser treated PVDF coating after bath sonication treatment for adhesivity testing.

Similar experiments as mentioned above were performed on polyethylene oxide (PEO), polyvinyl butyral (PVB), polyvinyl alcohol (PVA), polymethyl methacrylate (PMMA), polyacrylic acid (PAA), polyvinyl acetate (PVAc) coatings on a copper substrate, but these did not result in laser-induced carbon coating. They just showed colour changes, e.g., PMMA polymer, as shown in FIG. 3(a, b). We found that PVDF coating on copper foil yields laser-induced carbon coating but had extremely poor adhesion as revealed by detachment from the Cu foil after bath sonication; see FIG. 3(c-e).

Example 1: Preparation of GLC from FA on Cu Foil

FA was drop cast on a Cu foil and heated at 120° C. for 10 hours rendering a polymerised solid brown coloured PFA film. The PFA coating thickness was typically around 20 μm on the surface. $CO_2$ Laser processing was performed on this coating at a laser speed of 50 mm/s, and the distance between two scanning lines was kept at 0.1 mm. After scanning in the X-direction, the same sample was scanned along the Y-direction, essentially causing double laser treatment of polymer coating to obtain GLC. Since the scanning lines had a finite separation between scan lines for both the X and Y scans, the overlap between successive lines occurred only at the X- and Y-scan intersections.

Example 2: Preparation of GLC from FA on PET Substrate

FA was drop cast on a PET substrate and heated at 120° C. for 10 hours rendering a polymerised solid brown coloured PFA film. The PFA coating thickness was typically around 20 μm on the surface. $CO_2$ Laser processing was performed on this coating at a laser speed of 50 mm/s, and the distance between two scanning lines was kept at 0.1 mm. After scanning in the X-direction, the same sample was scanned along the Y-direction, essentially causing double laser treatment of polymer coating to obtain the microgradient patterned GLC.

Figure 8:
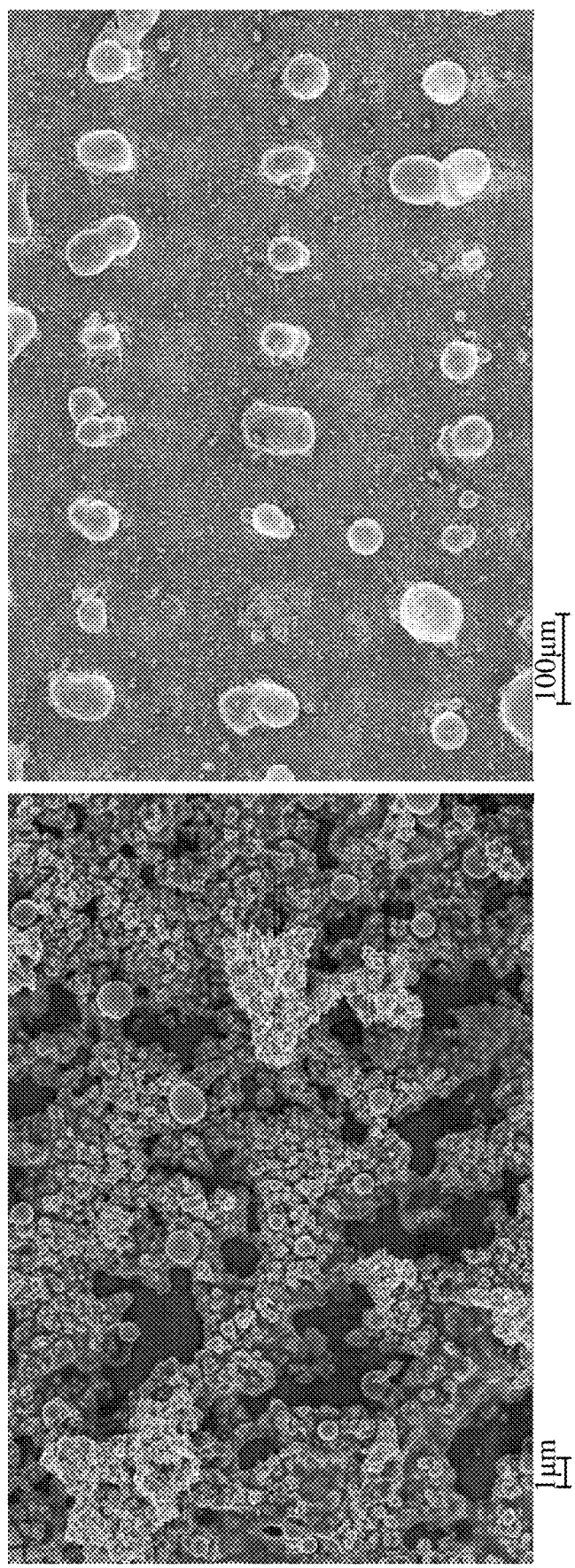
FIG. 8(a,b) represents FESEM images of $Fe_2O_3$-FA laser treated with 4.5 W scanspeed: 200 mm/s at two different magnifications showing the morphology of carbon-Iron oxide composite formed.
Figure 9:
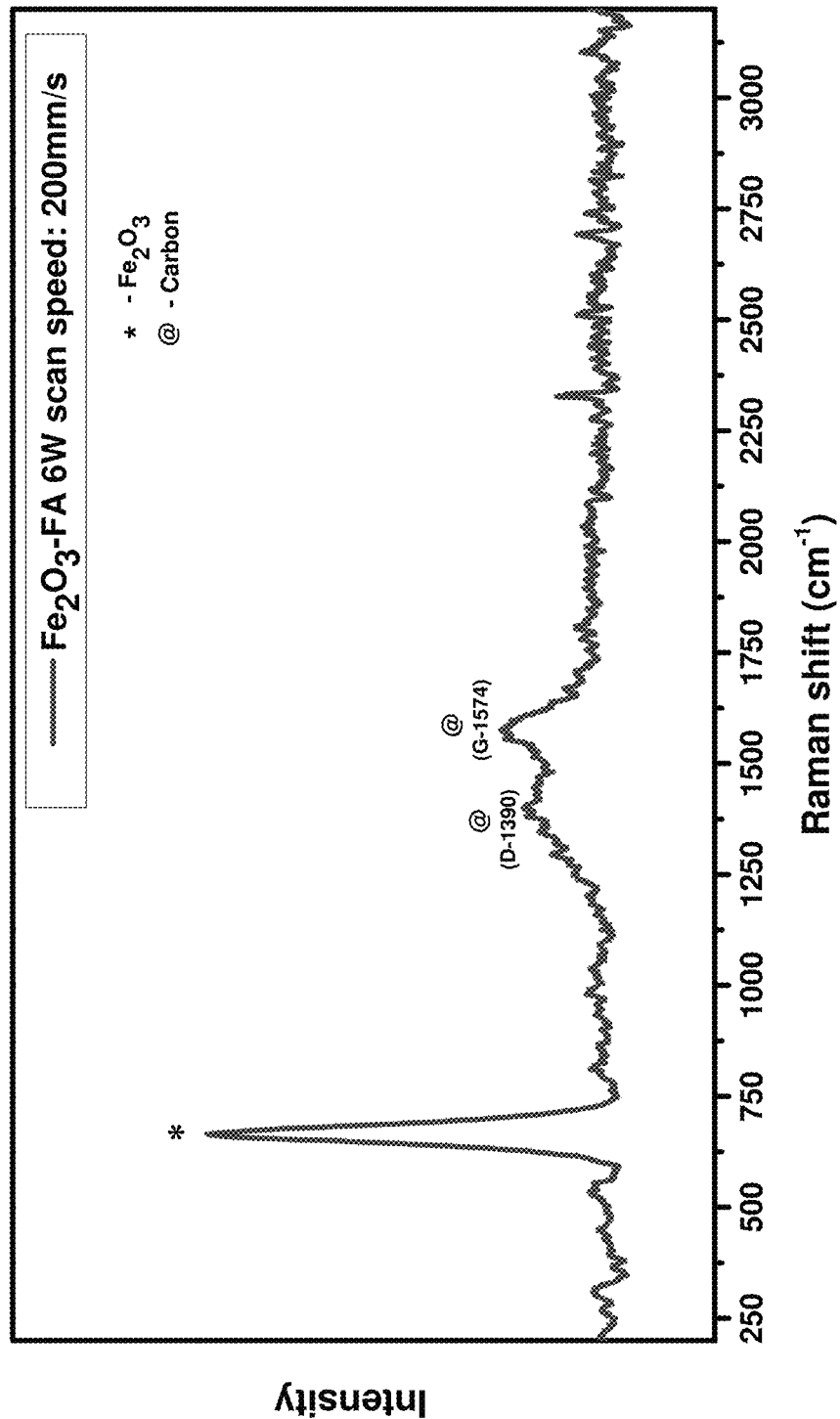
FIG. 9 represents Raman spectrum of CO2 laser treated $Fe_2O_3$-FA composite at 4.5 W scan speed: 200 mm/s (The Raman signatures of both Fe2O3 and carbon (D-band and G band are indicated).

Example 3: Preparation of GLC from Inorganic Material Composite with FA $Fe_2O_3$ (500 mg) was added in Furfuryl alcohol (1 mL) and stirred continuously until the formation of homogenous slurry. Then the formed slurry was coated on copper foil and dried at 120° C. Later, the dried coating was treated with 4.5 W $CO_2$ laser power at the scanning speed of 200 mm/s in xy directions. FIGS. 8(a and b) represents the results by FESEM. Further the GLC was analyzed by Raman spectroscopy (FIG. 9).

Example 4: Preparation of GLC from Polymer (PVDF) Composite with FA

Figure 10:
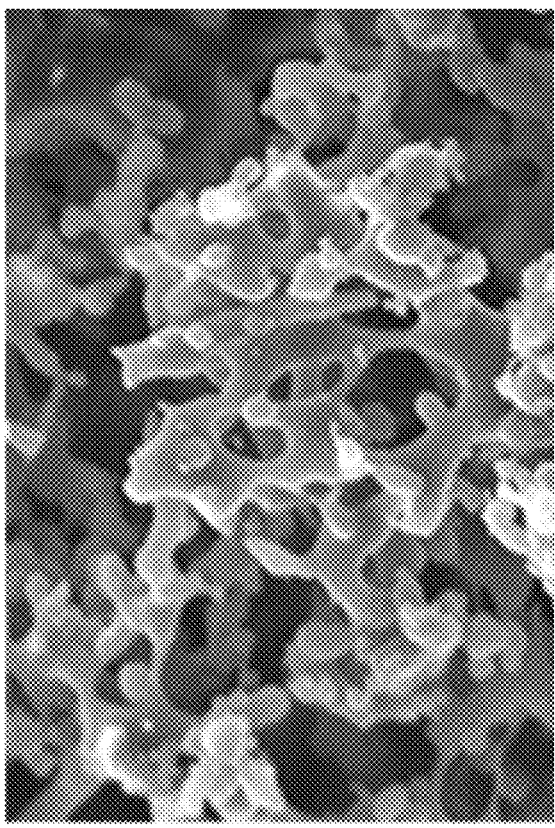
FIG. 10(a,b) represents FESEM images of PVDF-FA composite $CO_2$ laser treated with 1.5 W at a scan speed: 50 mm/s. The left side image is the morphology of carbon on the laser scan lines region and the right side represents the morphology between the X and Y scan lines.
Figure 10:
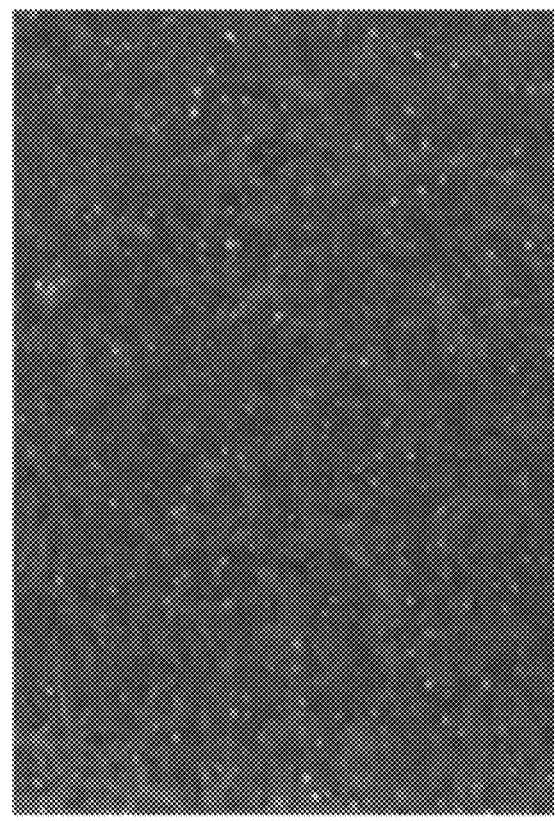
Figure 12:
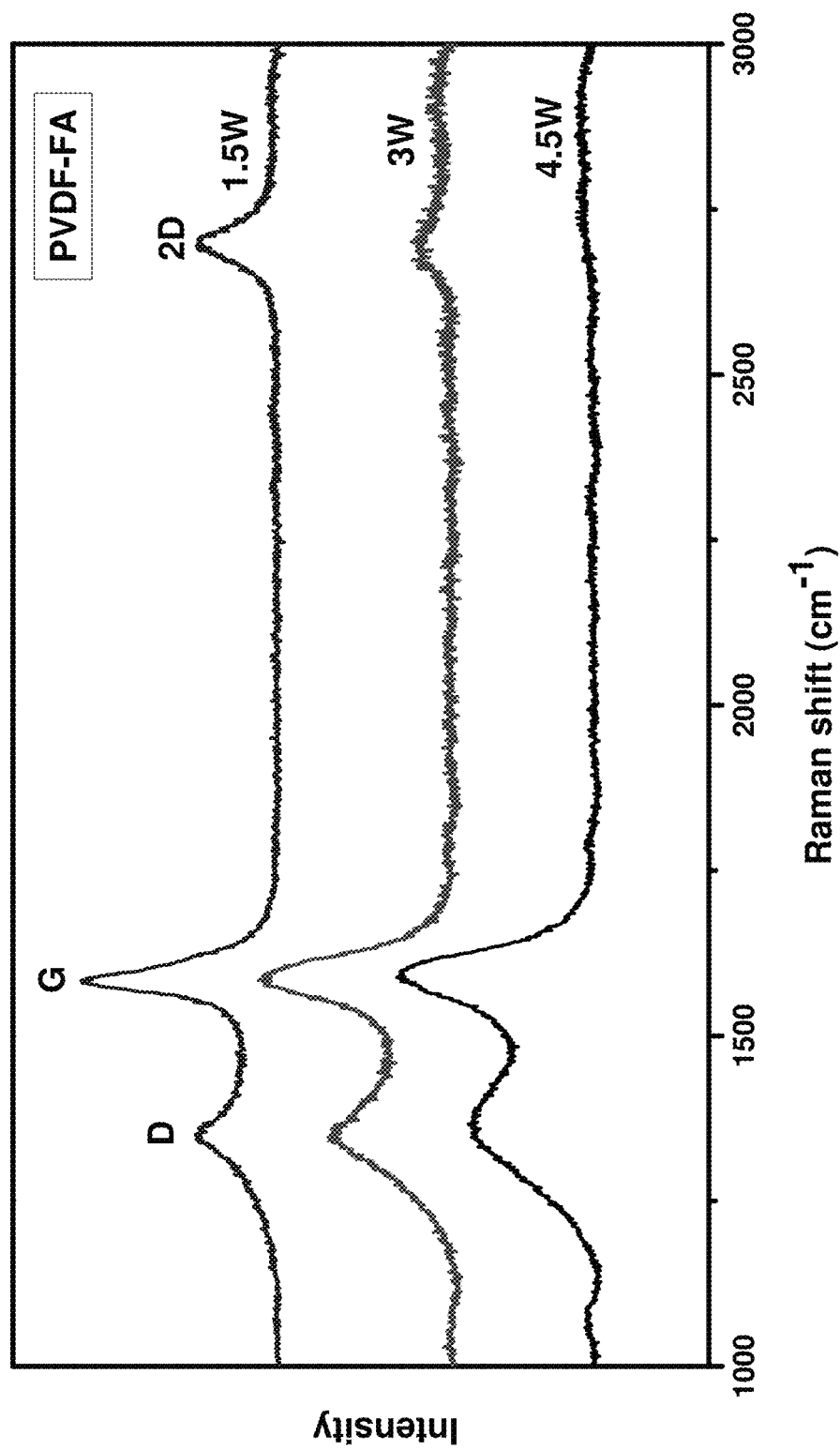
FIG. 12 represents the Raman spectra of $CO_2$ laser treated PVDF-FA composite at different laser powers with scanspeed: 50 mm/s sample

Furfuryl alcohol (1 mL) and polyvinylidene fluoride (PVDF) (500 mg) were both dissolved in ethanol and heated at 120° C. to form thick, homogenous slurry. This slurry was coated on copper foil and again dried at 120° C. Then this coating was treated with different laser powers at 50 mm/s scanning speed in xy directions to form graphene-like carbon. FIG. 10(a and b) represents the results by FESEM. Further the GLC was analyzed by Raman spectroscopy (FIG. 12).

Figure 11:
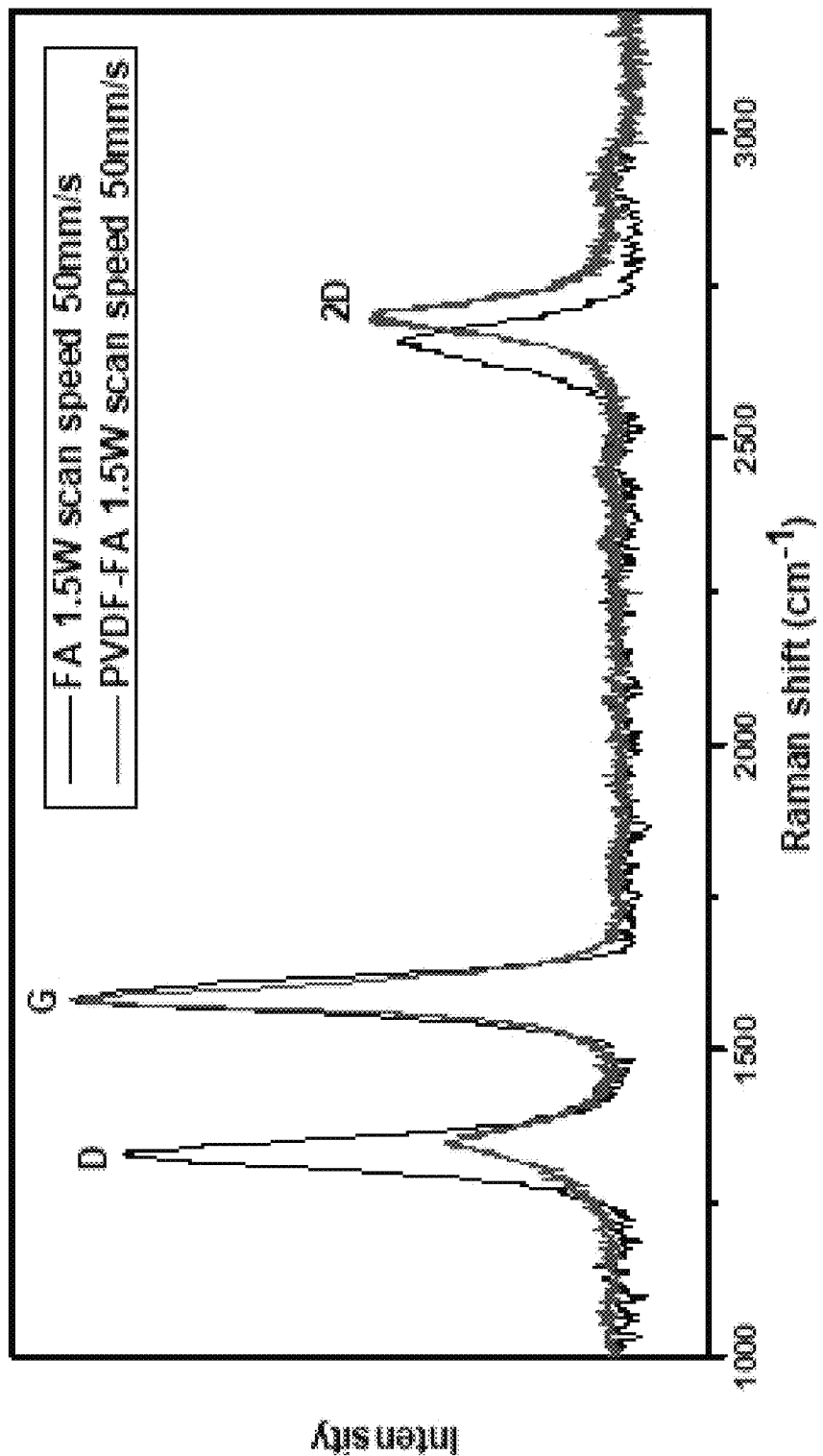
FIG. 11 represents Comparison of the Raman Spectra for $CO_2$ laser treated FA and $CO_2$ laser treated FA-PVDF composite. Major differences are seen in the D (defect) band signature and the 2D graphene band around 2700 $cm^{-1}$. Thus, the process of $CO_2$ laser treatment of a polymer-polymer composite can lead to new carbon structures which would be useful in different applications.

Additionally, $CO_2$ laser treated FA and $CO_2$ laser treated FA-PVDF composite were analyzed by Raman spectra. Major differences are seen in the D (defect) band signature and the 2D graphene band around 2700 $cm^{-1}$. Thus, the process of $CO_2$ laser treatment of a polymer-polymer composite can lead to new carbon structures which would be useful in different applications (FIG. 11).

Characterization

Figure 4:
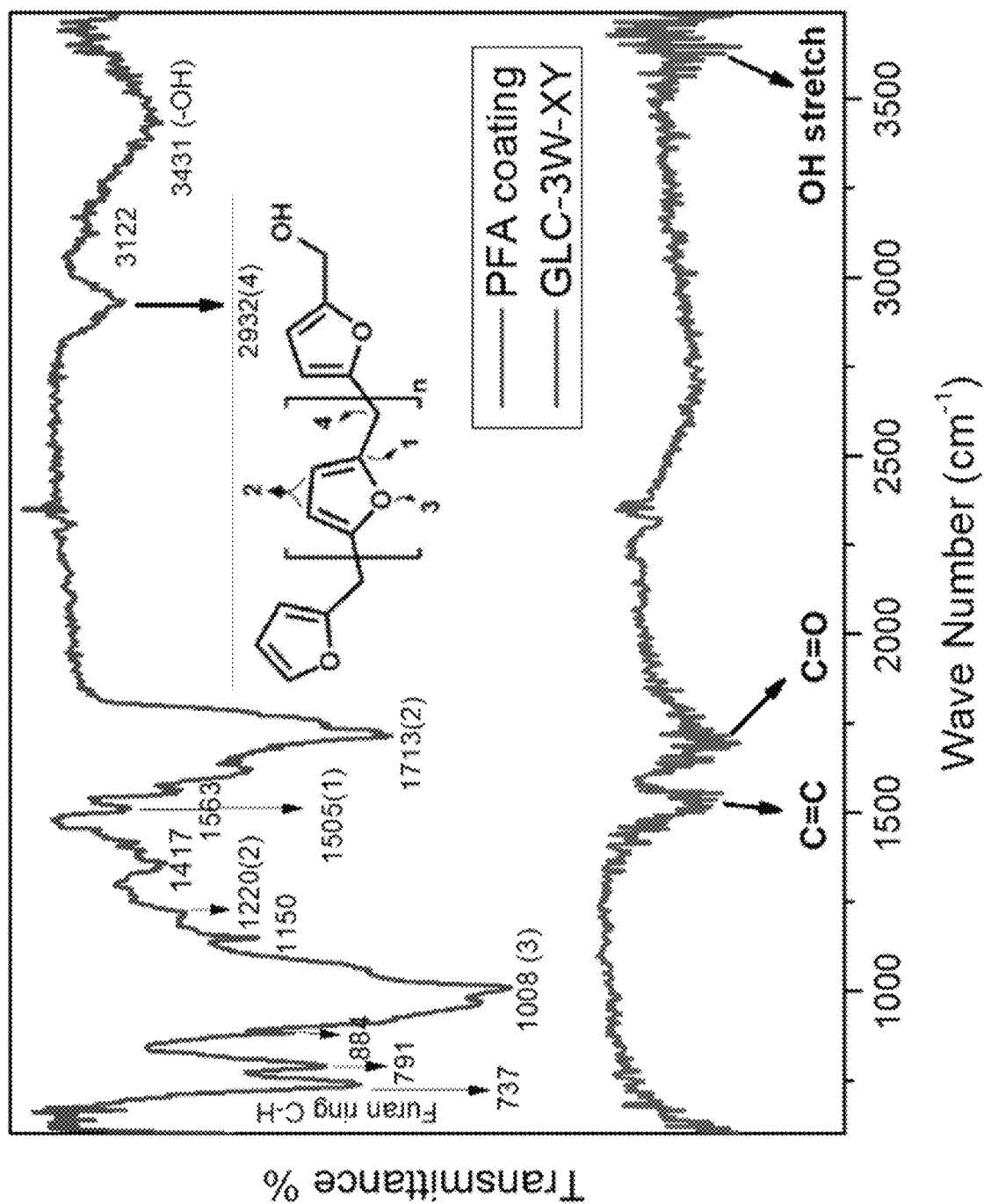
FIG. 4 shows Attenuated Total Reflection (ATR) spectroscopy of PFA coating and laser synthesised GLC at 3 W in XY direction on Cu substrate.

Attenuated Total Reflection (ATR): Results of the ATR analysis of PFA polymer coating and GLC-3 W-XY are shown in (FIG. 4) for microstructural bonding characterisation. All the three peaks at 737, 1150 and 1505 $cm^{-1}$ correspond to the —C—H bond of the furan ring. The peak at 1008 $cm^{-1}$ corresponds to the vibration of the C—O bond of the furan ring, and the peaks at 1220 $cm^{-1}$ are attributed to the C—O—C bond of the furan ring or C—O bond from the alcohol. The peaks of conjugated C=C arise at 1360 $cm^{-1}$ and 1563 $cm^{-1}$. Additional peaks appear at 1417 $cm^{-1}$ which belongs to —CH2-CO—, and 1713 $cm^{-1}$, ascribed to aliphatic di-ketone, and originate from the conjugation of oxygen loan pair into the furan ring. The peak at 2932 $cm^{-1}$ represents the methyl (—CH2-OH) group, 3122 $cm^{-1}$ for C3 and C4 carbon of the furan ring, and 3431 $cm^{-1}$ represent —OH stretching mode of PFA. These peaks confirm the successful formation of PFA after heat treatment of FA (Edwards, E. R.; et al., *Polimeros* 2018, 28, 15-22). However, when the polymer was irradiated with a $CO_2$ laser with 3 W power in the XY direction, most of the peaks belonging to PFA were seen to have disappeared, representing the complete decomposition of PFA. Three distinct peaks were observed after laser irradiation at 1554 $cm^{-1}$, 1693 $cm^{-1}$ and 3448 $cm^{-1}$, representing —C=C—, —C=O and —OH stretching frequencies. The dominant —C=C— peak clearly represents graphitisation (signature of conductive carbon) occurring after laser irradiation. Additional peaks —C=O and —OH represent defect characters naturally imparted to GLC by the laser process under ambient atmosphere. Further, these observations match well with the X-ray photoelectron (XPS) and Raman measurements discussed later.

Raman spectroscopy: Raman spectroscopy is usually used to detect the local bonding structure of carbon materials. When the PFA polymer coated on Cu substrate is laser treated, it is noted to be fully converted into graphitised carbon with the G, D, and 2D bands, as seen in FIG. 5(a). At a low laser power of 1.5 W, the $I_G/I_D$ ratio for the carbon coating (for laser scan only in one X-direction) is seen to be 1.24 (FIG. 5(b)); this being the ratio of peak intensities of G ($I_G$ graphitic) and D ($I_D$ defect) bands at ~1590 $cm^{-1}$ and ~1320 $cm^{-1}$, respectively. Increasing the laser power to 3 W (unidirectional scan) enhances the $I_G/I_D$ ratio to 1.45. Irradiating the same film (GLC-3 W-X) with the same power in another direction (X and Y, GLC-3 W-XY) is seen to further increase the graphitic nature of carbon with an $I_G/I_D$ ratio of 1.71 (FIG. 5(b)). The $I_G/I_D$ ratio of PFA derived GLC-3 W-XY is the maximum and is similar to or higher than many existing literature reports based on GLC from various polymeric and natural sources (FIG. 1). These results indicate that PFA is clearly a potentially interesting and important precursor source to synthesise GLC.

Figure 5:
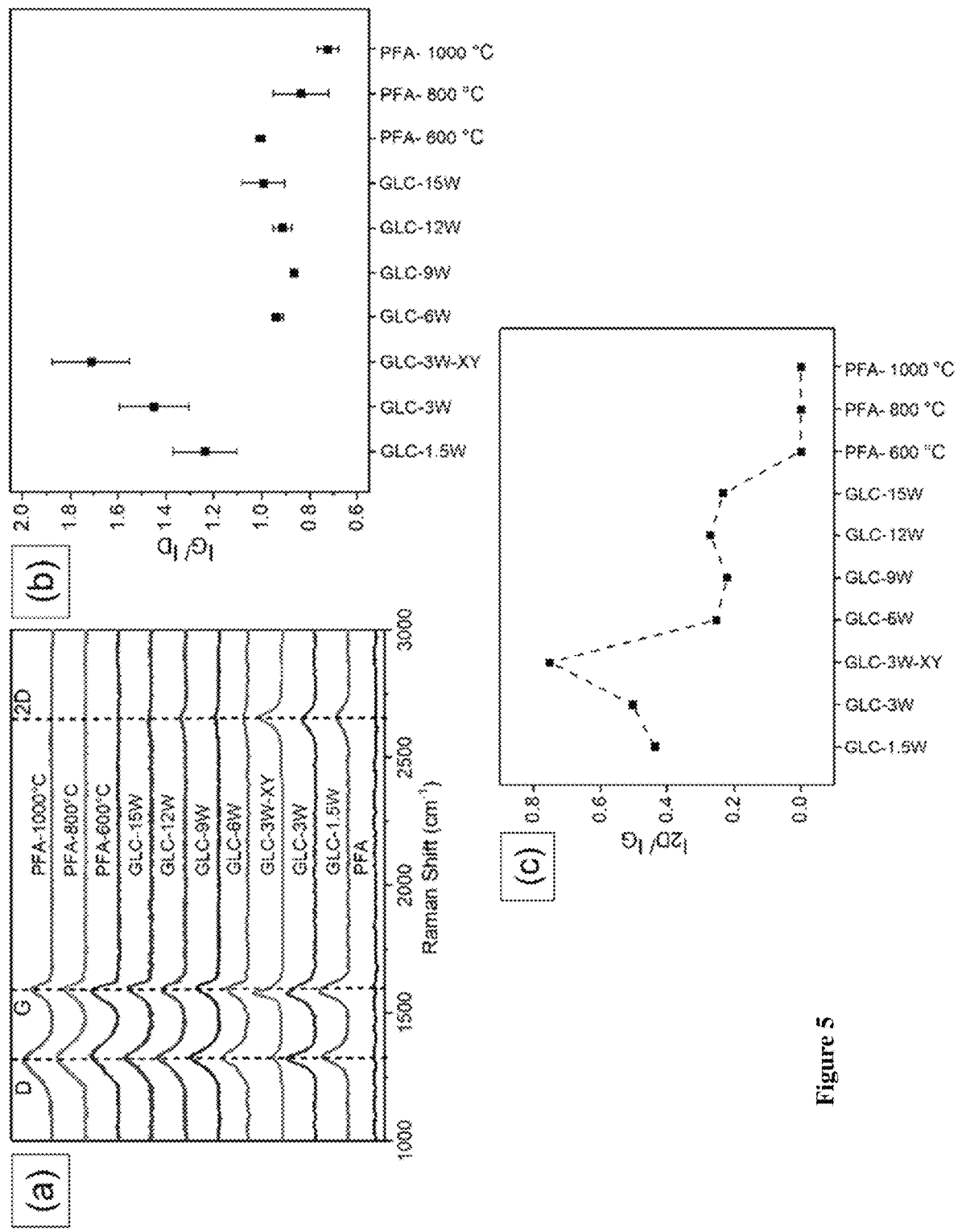
FIG. 5 represents (a) Raman spectra comparing PFA precursor coating, GLC from PFA at different laser power, and pyrolysed PFA coating at different temperatures, (b) Average $I_G/I_D$ ratio of GLC from laser-treated PFA and pyrolysed PFA at different temperatures, (c) $I_{2D}/I_G$ ratio for calculating the number of graphene layers.

Further increase in laser power (6 W) degrades the quality of graphitic nature, with $I_G/I_D$ ratio decreasing down to 0.94. Importantly, the presence of 2D peaks at ~2654 cm$^{-1}$ observed for PFA derived GLC indicates the few-layer graphene-like nature of the carbon (Wu, J. B.; et al., *Chemical Society reviews* 2018, 47 (5), 1822-1873), (Papanai, G. S.; et al., *Materials Today Communications* 2020, 22, 100795). Typically, we can conclude that 4-5 layers of graphene sheets are formed as revealed by the calibration based on the $I_{2D}/I_G$ ratio 0.43 for GLC-1.5 W; here, $I_{2D}$ is the intensity of the 2D band. We get the maximum $I_{2D}/I_G$ ratio for GLC-3 W-XY, which is 0.75 (FIG. 5(c)), corresponding to bilayer graphene. As the power is increased to more than 3 W, $I_{2D}/I_G$ value is progressively reduced, indicating enhanced stacking of graphene (Bleu, Y.; et al., *Journal of Raman Spectroscopy* 2019, 50 (11), 1630-1641). Most importantly, the PFA derived carbon by CO$_2$ laser processing is quite dissimilar to carbon obtained by PFA coating annealed under Argon at a 600 to 1000° C. range temperature. Such treatments mostly lead to glassy carbon with $I_G/I_D$ ratio within the range between 0.7 to 1. Moreover, the absence of a 2D peak signifies no graphene-like signature in this case (FIG. 5).

Figure 6:
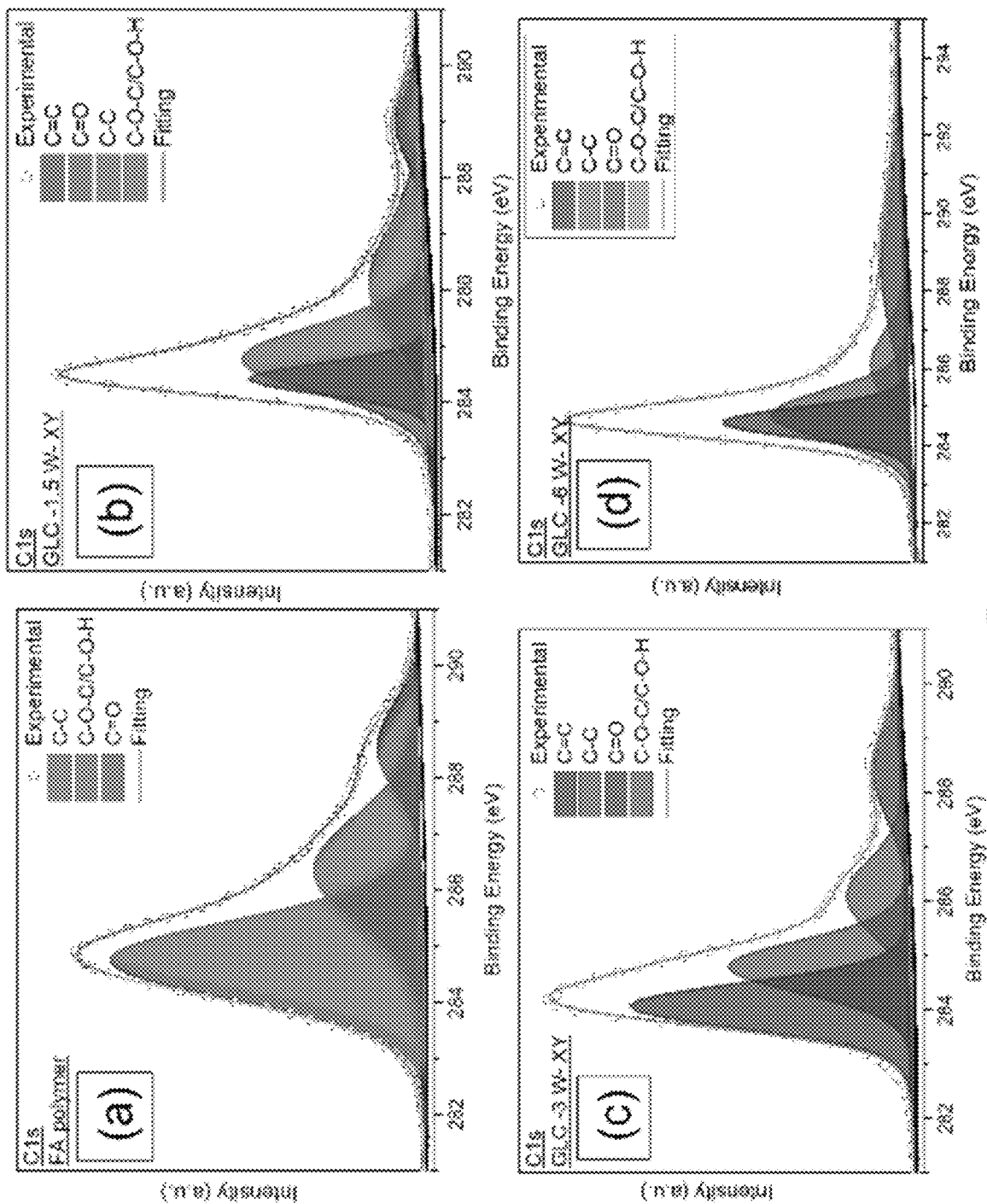
FIG. 6 represents X-ray photon C1s spectra of (a) PFA, (b) GLC-1.5 W-XY, (c) GLC-3 W-XY, and (d) GLC-6 W-XY.

X-ray Photoelectron Spectroscopy (XPS): Further XPS of PFA derived GLC was performed to understand the nature of carbon and its functionalisation with the changes in the laser processing parameters. The C1s spectrum of FA polymer coating prior to laser treatment was de-convoluted into three peaks (FIG. 6(a)). In FA polymer, the peak at 284.8 eV corresponds to delocalised sp$^2$-sp$^3$ hybridised carbon, at 286.4 eV to C—O—C species, and the smaller one at 288.8 eV to the C=O species (Spange, S.; et al., *Studies in Surface Science and Catalysis*, Elsevier: 2001; Vol. 132, pp 301-306), (Militzer, C.; et al., *Journal of Vacuum Science & Technology A: Vacuum, Surfaces, and Films* 2017, 35 (1), 01B107). As we treat FA polymer film with a CO$_2$ laser at different powers in air ambient, peaks corresponding to the sp$^2$ and sp$^3$ hybridised species emerge as two distinct peaks (FIG. 6(b-c)). In the GLC-1.5 W-XY sample, the peaks at 284.4 eV and 284.8 eV correspond to sp$^{2+}$ and sp$^3$ hybridised carbons, respectively (FIG. 6(b)). Distinct sp$^2$ carbon peak of GLC signifies the occurrence of graphitisation of PFA derived GLC, also consistent with the appearance of G band in Raman spectra for GLC-1.5 W. Peak intensities for C—O—C and —C=O (286.08 eV and 289.01 eV, respectively) decrease from the PFA data to GLC data indicating photothermal rupture of the bonds in FA polymer leading to the formation of porous and amorphous carbonaceous structures after the release of gaseous decomposition products (Cao, L.; et al., *Carbon* 2020, 163, 85-94). Additionally, when the laser energy increases to 3 W, the relative percentage of sp$^2$ hybridised carbon over sp$^3$ increases, indicating a higher degree of graphene character of GLC-3 W-XY (FIG. 6(c)). Increasing the laser power to 6 W, the percentage of sp$^2$ carbon over sp$^3$ drops (FIG. 6(d)). The same trend is also visible in the Raman spectra, where the intensity ratio of the $I_G/I_D$ is directly proportional to the percentage of sp$^2$ hybridised carbon. The origin of more defective carbon after increasing laser power to more than 3 W could be attributed to the increase in the formation of 5 or 7 member rings, which are essential for 3D curvature (like buckyball case) (Jorio, A., *ISRN Nanotechnology* 2012, 2012, 1-16).

Figure 7:
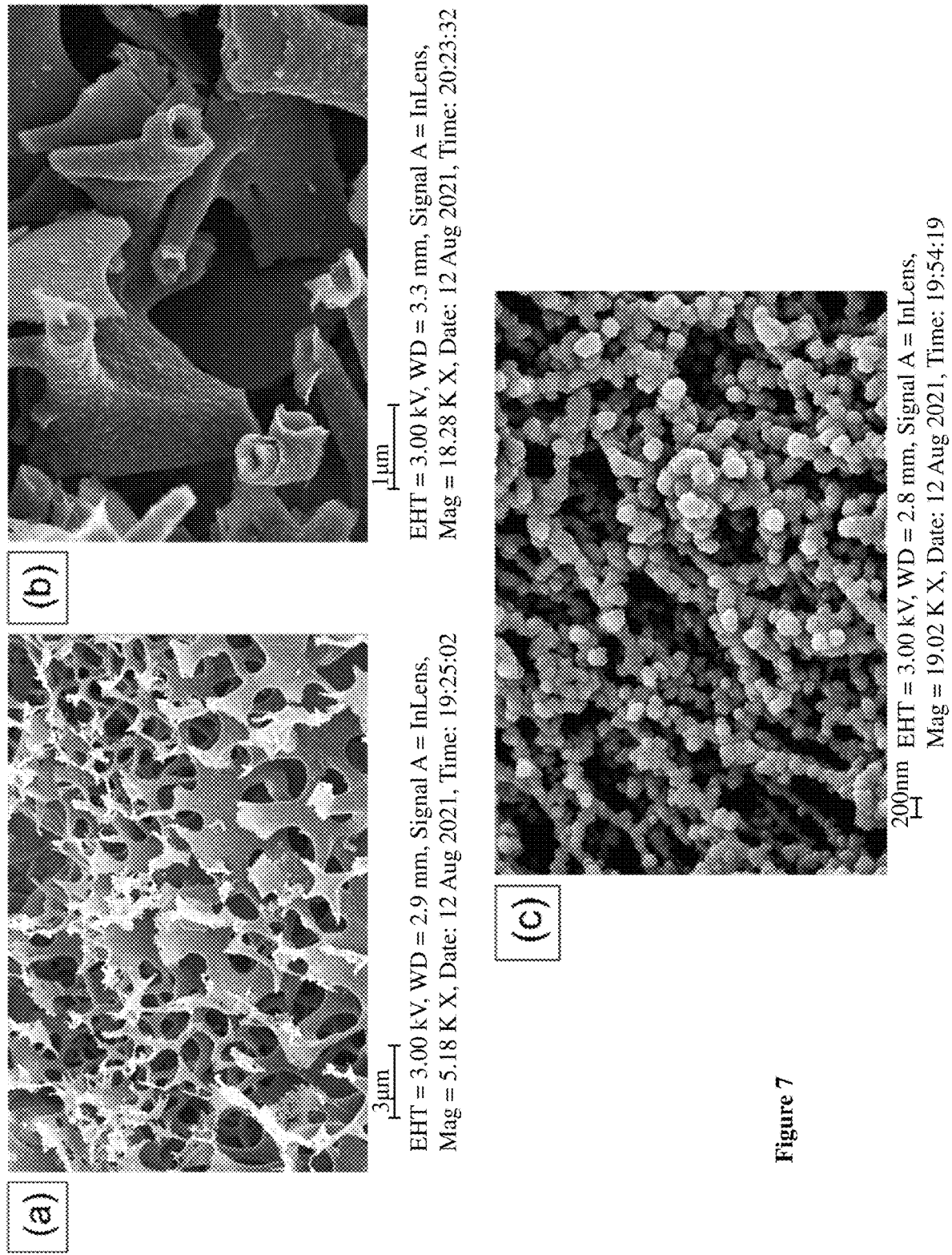
FIG. 7 represents FESEM images of GLC at different power in XY direction (a) 1.5 W, (b) 3 W, and (c) 6 W.

Field emission scanning electron microscopy (FESEM): The morphology and structure of PFA and PFA-derived GLC were explored using field emission scanning electron microscopy (FESEM). We observe that when PFA coating is photothermally decomposed with different laser powers, the morphology of GLC nanostructures changes. At lower power of 1.5 W, the morphology of carbon nanostructure formed is majorly in the form of thin sheets (FIG. 7(a)). As we increase power to 3 W, the sheet type morphology breaks into carbon microtubes (FIG. 7(b)). Further, increase in power to 6 W, the carbon microtubes get reconfigured into connected porous nanosphere chain structures (FIG. 7(c)). Here, an increase in laser power decreases the morphological forms and length scales from sheets to microtubes to nanosphere chain structures (Duy, L. X.; et al., *Carbon* 2018, 126, 472-479).

Advantages of the Present Disclosure

Furfuryl Alcohol (FA) is liquid at room temperature; hence it can be easily coated on any substrate (e.g., metallic and non-metallic, solid as well as a polymer) employing any convenient and simple solvent-free method to form PFA coating, which can be further CO$_2$ laser treated to convert into GLC.

FA is a product of furfural which is produced from waste biomass, and hence it is a highly cost-effective organic compound. Hence, the GLC coating process using CO$_2$ laser and furfuryl alcohol is an inexpensive, simple, and easily scalable process.

The low-temperature thermal polymerisation process employed here does not need any external acid addition to convert FA to polymerised FA (PFA).

A skilled artisan will appreciate that the quantity and type of each ingredient can be used in different combinations or singly. All such variations and combinations would be falling within the scope of the present disclosure.

The foregoing examples are merely illustrative and are not to be taken as limitations upon the scope of the invention. Various changes and modifications to the disclosed embodiments will be apparent to those skilled in the art. Such changes and modifications may be made without departing from the scope of the invention.

REFERENCES 1. (a) Liu, J.; Zhang, L.; Yang, C.; Tao, S., Preparation of multifunctional porous carbon electrodes through direct laser writing on a phenolic resin film. *Journal of Materials Chemistry A* 2019, 7 (37), 21168-21175; (b) Li, F.; Zhou, Z., Micro/Nanostructured Materials for Sodium Ion Batteries and Capacitors. *Small* 2018, 14 (6); (c) Zhang, L. L.; Zhao, X. S., Carbon-based materials as supercapacitor electrodes. *Chemical Society reviews* 2009, 38 (9), 2520-31; (d) Chinnadurai, D.; Karuppiah, P.; Chen, S. M.; Kim, H. j.; Prabakar, K., Metal-free multiporous carbon for electrochemical energy storage and electrocatalysis applications. *New Journal of Chemistry* 2019, 43 (29), 11653-11659; (e) Inagaki, M.; Kang, F., *Materials science and engineering of carbon: fundamentals*. Butterworth-Heinemann: 2014.

2. Zhang, P.; Zhu, H.; Dai, S., Porous carbon supports: Recent advances with various morphologies and compositions. *ChemCatChem* 2015, 7 (18).
3. Liang, M.; Luo, B.; Zhi, L., Application of graphene and graphene-based materials in clean energy-related devices. *International Journal of Energy Research* 2009, 33 (13), 1161-1170.
4. Allen, M. J.; Tung, V. C.; Kaner, R. B., Honeycomb carbon: a review of graphene. *Chemical reviews* 2010, 110 (1), 132-145.
5. Campbell, B.; Manning, J., *The rise of victimhood culture: Microaggressions, safe spaces, and the new culture wars*. Springer: 2018.
6. Lee, X. J.; Hiew, B. Y. Z.; Lai, K. C.; Lee, L. Y.; Gan, S.; Thangalazhy-Gopakumar, S.; Rigby, S., Review on graphene and its derivatives: Synthesis methods and potential industrial implementation. *Journal of the Taiwan Institute of Chemical Engineers* 2019, 98, 163-180.
7. Lin, J.; Peng, Z.; Liu, Y.; Ruiz-Zepeda, F.; Ye, R.; Samuel, E. L.; Yacaman, M. J.; Yakobson, B. I.; Tour, J. M., Laser-induced porous graphene films from commercial polymers. *Nature communications* 2014, 5 (1), 1-8.
8. Wang, W.; Lu, L.; Xie, Y.; Li, Z.; Wu, W.; Liang, R.; Tang, Y., One-step laser induced conversion of a gelatin-coated polyimide film into graphene: Tunable morphology, surface wettability and microsupercapacitor applications. *Science China Technological Sciences* 2021, 64, 1030-1040.
9. Singh, S. P.; Li, Y.; Zhang, J.; Tour, J. M.; Arnusch, C. J., Sulfur-doped laser-induced porous graphene derived from polysulfone-class polymers and membranes. *ACS nano* 2018, 12 (1), 289-297.
10. Ye, R.; Chyan, Y.; Zhang, J.; Li, Y.; Han, X.; Kittrell, C.; Tour, J. M., Laser-induced graphene formation on wood. *Advanced Materials* 2017, 29 (37), 1702211.
11. Chyan, Y.; Ye, R.; Li, Y.; Singh, S. P.; Arnusch, C. J.; Tour, J. M., Laser-induced graphene by multiple lasing: toward electronics on cloth, paper, and food. *ACS nano* 2018, 12 (3), 2176-2183.
12. Nair, V.; Yi, J.; Isheim, D.; Rotenberg, M.; Meng, L.; Shi, F.; Chen, X.; Gao, X.; Prominski, A.; Jiang, Y., Laser writing of nitrogen-doped silicon carbide for biological modulation. *Science advances* 2020, 6 (34), eaaz2743.
13. Ye, R.; Han, X.; Kosynkin, D. V.; Li, Y.; Zhang, C.; Jiang, B.; Marti, A. A.; Tour, J. M., Laser-induced conversion of teflon into fluorinated nanodiamonds or fluorinated graphene. *ACS nano* 2018, 12 (2), 1083-1088.
14. Cao, L.; Zhu, S.; Pan, B.; Dai, X.; Zhao, W.; Liu, Y.; Xie, W.; Kuang, Y.; Liu, X., Stable and durable laser-induced graphene patterns embedded in polymer substrates. *Carbon* 2020, 163, 85-94.
15. Schmidt, H.; Ihlemann, J.; Wolff-Rottke, B.; Luther, K.; Troe, J., Ultraviolet laser ablation of polymers: spot size, pulse duration, and plume attenuation effects explained. *Journal of applied physics* 1998, 83 (10), 5458-5468.
16. Sousa, A. R.; Amorim, K. L. E.; Medeiros, E. S.; Melo, T. J. A.; Rabello, M. S., The combined effect of photodegradation and stress cracking in polystyrene. *Polymer Degradation and Stability* 2006, 91 (7), 1504-1512.
17. Yan, Y.; Mao, Y.; Li, B.; Zhou, P., Machinability of the Thermoplastic Polymers: PEEK, PI, and PMMA. *Polymers* 2020, 13 (1).
18. Edwards, E. R.; Oishi, S. S.; Botelho, E. C., Analysis of chemical polymerisation between functionalised MWCNT and poly (furfuryl alcohol) composite. *Polimeros* 2018, 28, 15-22.
19. Wu, J. B.; Lin, M. L.; Cong, X.; Liu, H. N.; Tan, P. H., Raman spectroscopy of graphene-based materials and its applications in related devices. *Chemical Society reviews* 2018, 47 (5), 1822-1873.
20. Papanai, G. S.; Sharma, I.; Gupta, B. K., Probing number of layers and quality assessment of mechanically exfoliated graphene via Raman fingerprint. *Materials Today Communications* 2020, 22, 100795.
21. Bleu, Y.; Bourquard, F.; Loir, A. S.; Barnier, V.; Garrelie, F.; Donnet, C., Raman study of the substrate influence on graphene synthesis using a solid carbon source via rapid thermal annealing. *Journal of Raman Spectroscopy* 2019, 50 (11), 1630-1641.
22. Spange, S.; Müller, H.; Pleul, D.; Simon, F., Structure formation of poly (furfuryl alcohol)/silica hybrids. In *Studies in Surface Science and Catalysis*, Elsevier: 2001; Vol. 132, pp 301-306.
23. Militzer, C.; Knohl, S.; Dzhagan, V.; Zahn, D. R.; Goedel, W. A., Deposition of an organic-inorganic hybrid material onto carbon fibers via the introduction of furfuryl alcohol into the atomic layer deposition process of titania and subsequent pyrolysis. *Journal of Vacuum Science & Technology A: Vacuum, Surfaces, and Films* 2017, 35 (1), 01B107.
24. Jorio, A., Raman Spectroscopy in Graphene-Based Systems: Prototypes for Nanoscience and Nanometrology. *ISRN Nanotechnology* 2012, 2012, 1-16. and
25. Duy, L. X.; Peng, Z.; Li, Y.; Zhang, J.; Ji, Y.; Tour, J. M., Laser-induced graphene fibers. *Carbon* 2018, 126, 472-479.

We claim:

1. A process for coating a graphene-like carbon (GLC) layer on multiple substrate types using $CO_2$ laser-induced photothermal pyrolysis, said process comprises the steps of:
   a. casting liquid furfuryl alcohol (FA) precursor on a substrate to obtain a FA-casted substrate;
   b. heating the FA-casted substrate to obtain a polymerised poly furfuryl alcohol (PFA) film-coated substrate; and
   c. graphitizing the PFA film coated substrate using $CO_2$ laser in scanning mode to obtain a GLC coating layer on the substrate;
   wherein, in step (b) heating is carried out at a temperature in a range of 60 deg C. to 130 deg C. without the use of any external acid catalyst, additive or any other extra step for the conversion of FA precursor to PFA film,
   wherein, said substrate coated with PFA film is directly converted into GLC under a $CO_2$ laser, and
   wherein, said process is effected at normal atmospheric conditions under a $CO_2$ laser.

2. The process as claimed in claim 1, wherein the furfuryl alcohol (FA) coating on a substrate can be a pure furfuryl alcohol (FA), or composites of FA with metal organic frameworks, covalent organic frameworks, organometallics, and metal complex compounds.

3. The process as claimed in claim 1, wherein said GLC coated substrate is a flexible substrate for a current collector anode free battery, a supercapacitor, an anode material for Li and Na ion battery, a conductive additive, or a counter electrode for solar cell.

* * * * *